Figure 1:
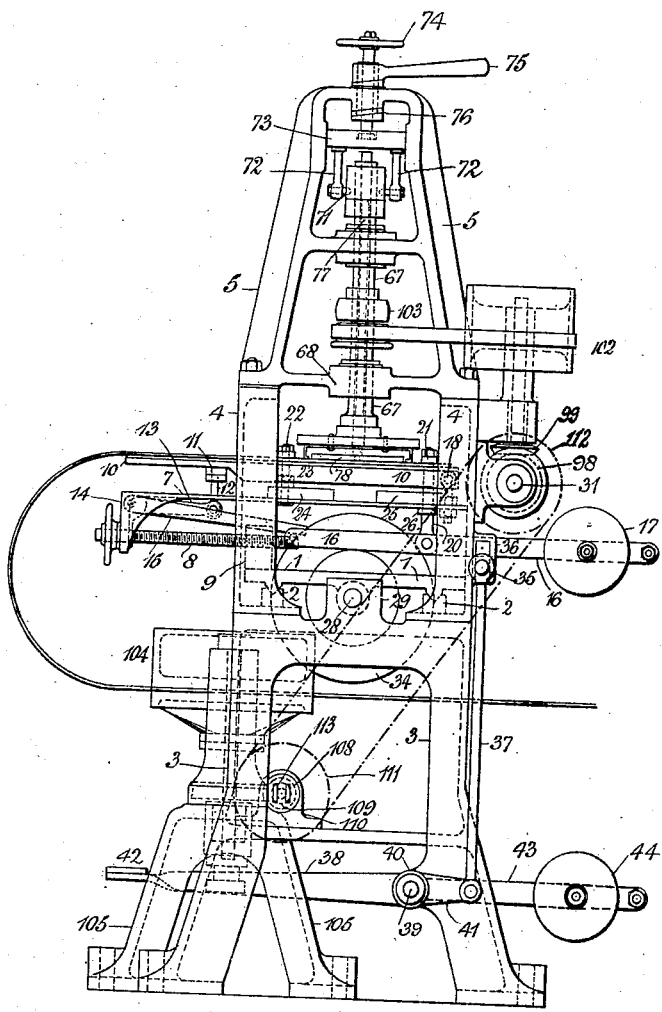

No. 884,528. PATENTED APR. 14, 1908.
E. F. SARGEANT.
MANUFACTURE OF LEATHER BELTING AND MACHINERY THEREFOR.
APPLICATION FILED AUG. 3, 1906.

9 SHEETS—SHEET 1.

Witnesses.
M. Lilian Adams
E. B. Bruner

Inventor.
Edward Frank Sargeant.
By his Attorneys,
Baldwin Wight

No. 884,528.  
PATENTED APR. 14, 1908.

E. F. SARGEANT.  
MANUFACTURE OF LEATHER BELTING AND MACHINERY THEREFOR.  
APPLICATION FILED AUG. 3, 1906.

9 SHEETS—SHEET 2.

Witnesses.  
M. Silian Adams  
E. B. Bruner

Inventor.  
Edward Frank Sargeant  
By his Attorneys,

No. 884,528. PATENTED APR. 14, 1908.
E. F. SARGEANT.
MANUFACTURE OF LEATHER BELTING AND MACHINERY THEREFOR.
APPLICATION FILED AUG. 3, 1906.
9 SHEETS—SHEET 3.
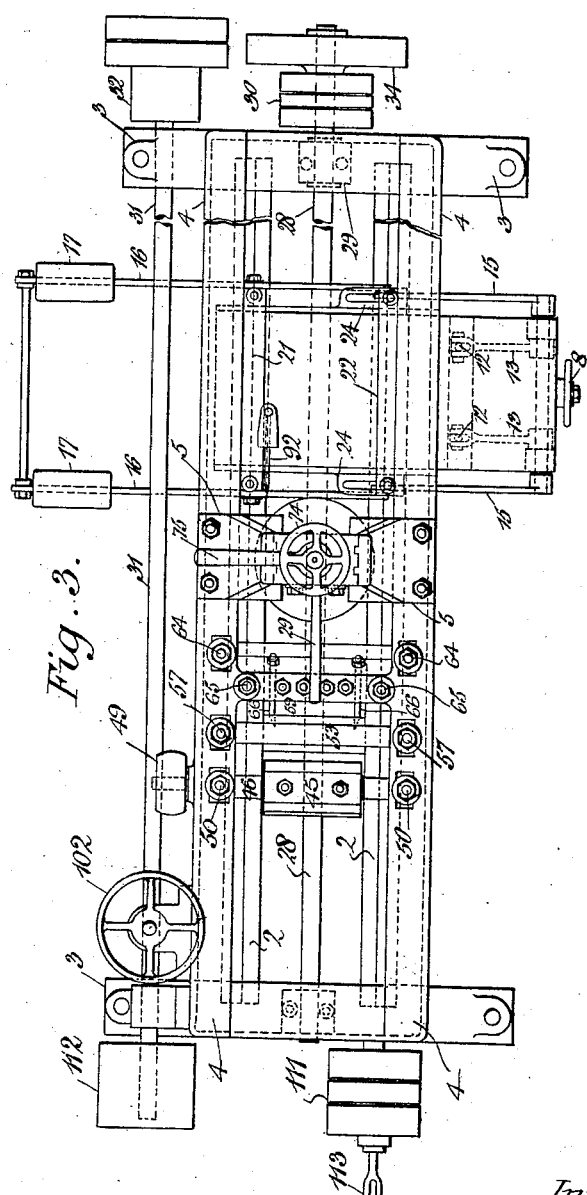

No. 884,528. PATENTED APR. 14, 1908.
E. F. SARGEANT.
MANUFACTURE OF LEATHER BELTING AND MACHINERY THEREFOR.
APPLICATION FILED AUG. 3, 1906.
9 SHEETS—SHEET 4.
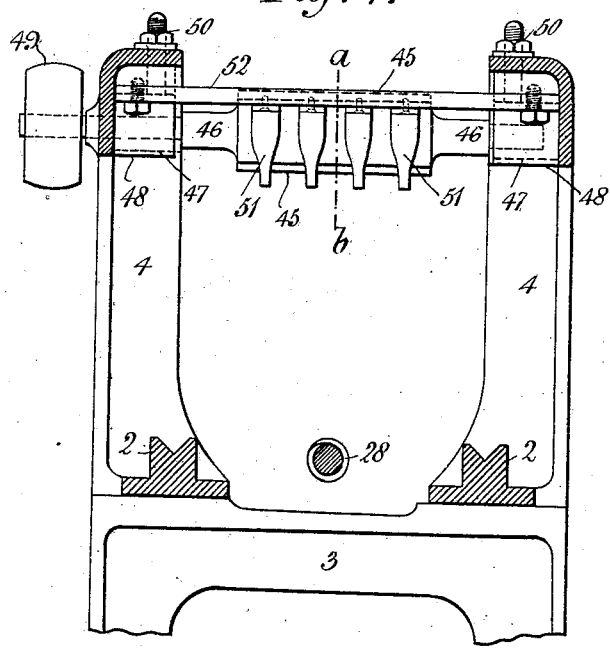
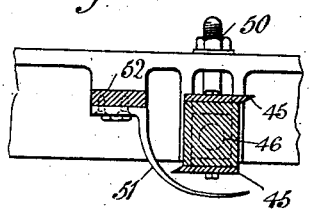
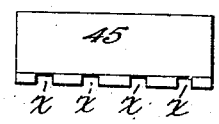
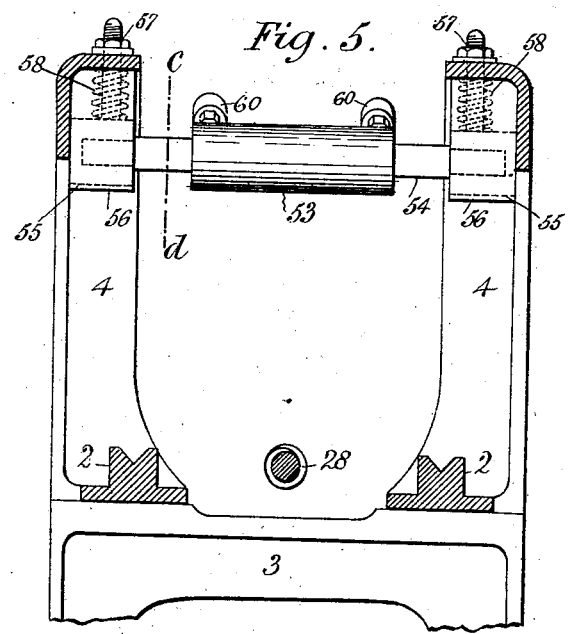
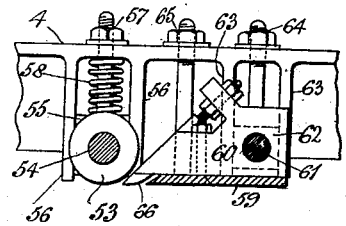
Witnesses.
M. Lilian Adams
E. B. Franzoni
Inventor:
Edward F. Sargeant
By his Attorneys
Baldwin Wight No. 884,528. PATENTED APR. 14, 1908.
E. F. SARGEANT.
MANUFACTURE OF LEATHER BELTING AND MACHINERY THEREFOR.
APPLICATION FILED AUG. 3, 1906.
9 SHEETS—SHEET 5.
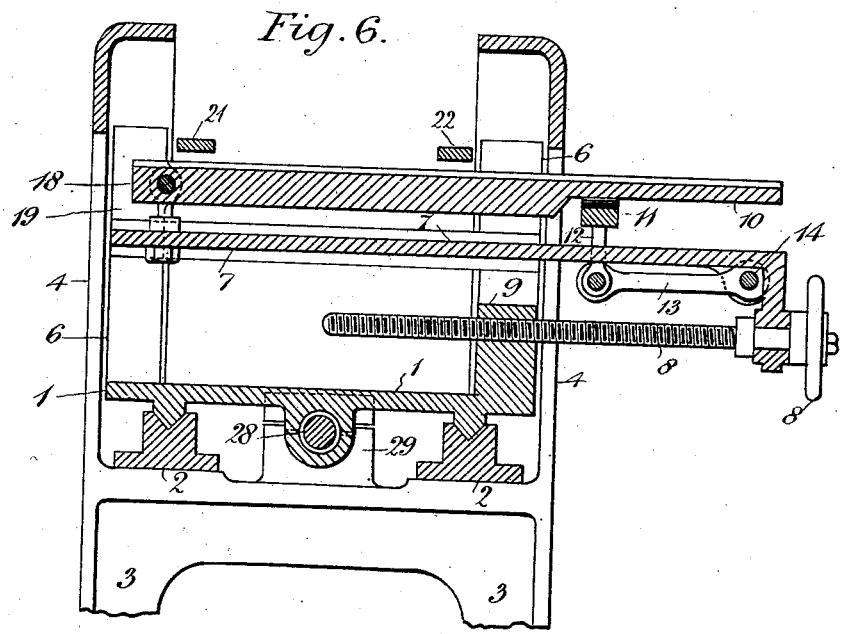
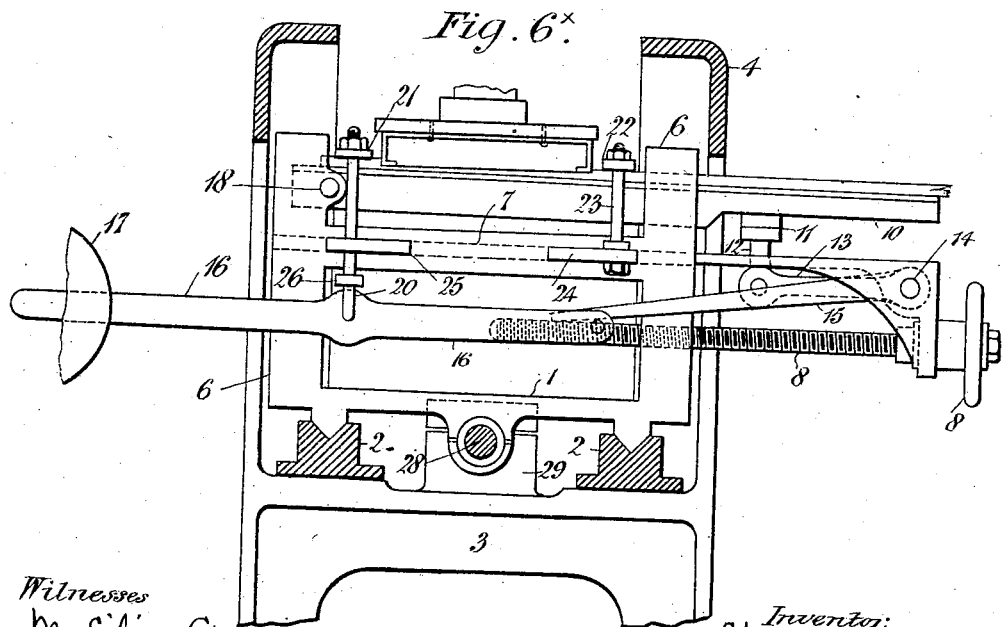

No. 884,528. PATENTED APR. 14, 1908.
E. F. SARGEANT.
MANUFACTURE OF LEATHER BELTING AND MACHINERY THEREFOR.
APPLICATION FILED AUG. 3, 1906.

9 SHEETS—SHEET 6.

No. 884,528. PATENTED APR. 14, 1908.
E. F. SARGEANT.
MANUFACTURE OF LEATHER BELTING AND MACHINERY THEREFOR.
APPLICATION FILED AUG. 3, 1906.
9 SHEETS—SHEET 7.
Fig. 12.
Fig. 8.
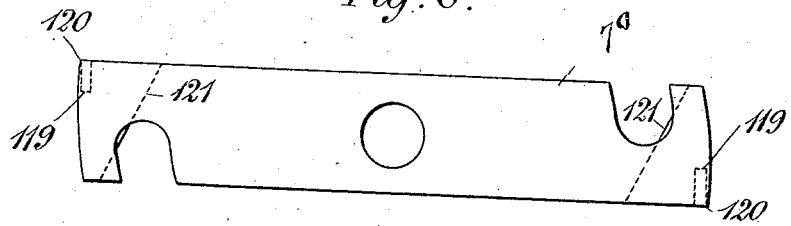
Fig. 9.
Fig. 10. Fig. 11.
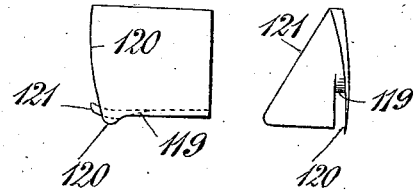
Witnesses
M. Silian Adams.
E. B. Brown.
Inventor
Edward Frank Sargeant
By his Attorneys,
Baldwin Wight.
THE NORRIS PETERS CO., WASHINGTON, D. C.

No. 884,528. PATENTED APR. 14, 1908.
E. F. SARGEANT.
MANUFACTURE OF LEATHER BELTING AND MACHINERY THEREFOR.
APPLICATION FILED AUG. 3, 1906.
9 SHEETS—SHEET 8.
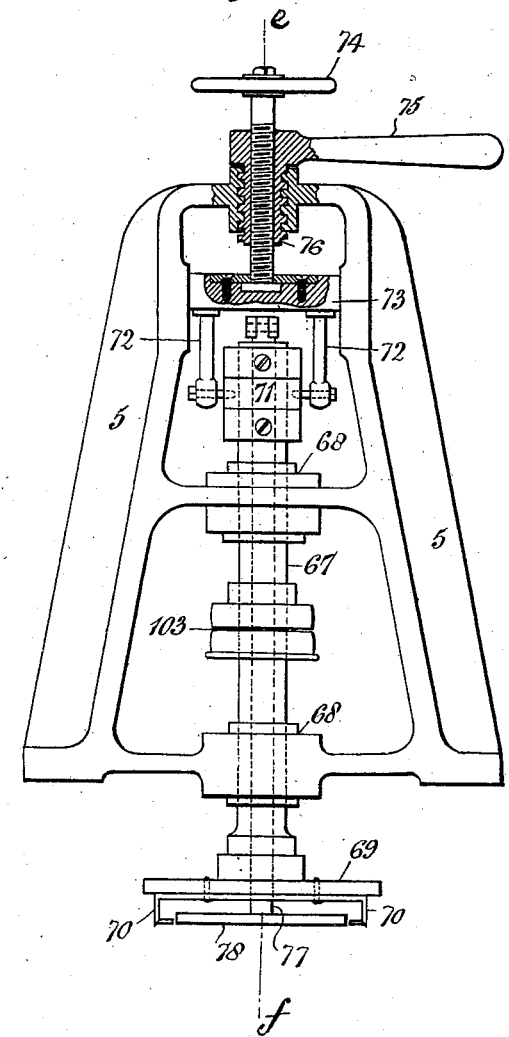
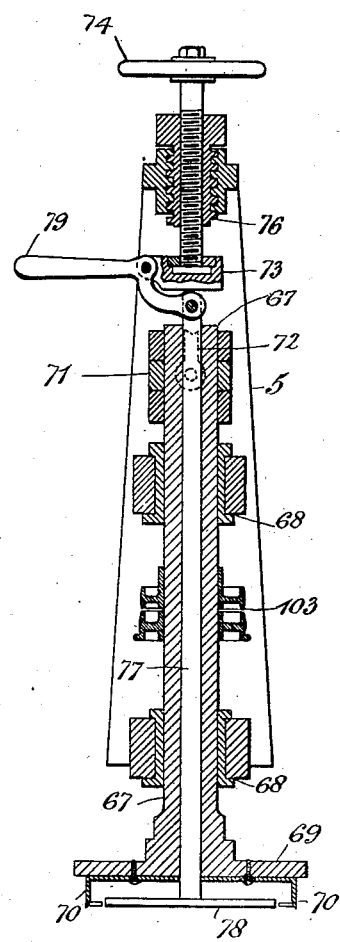

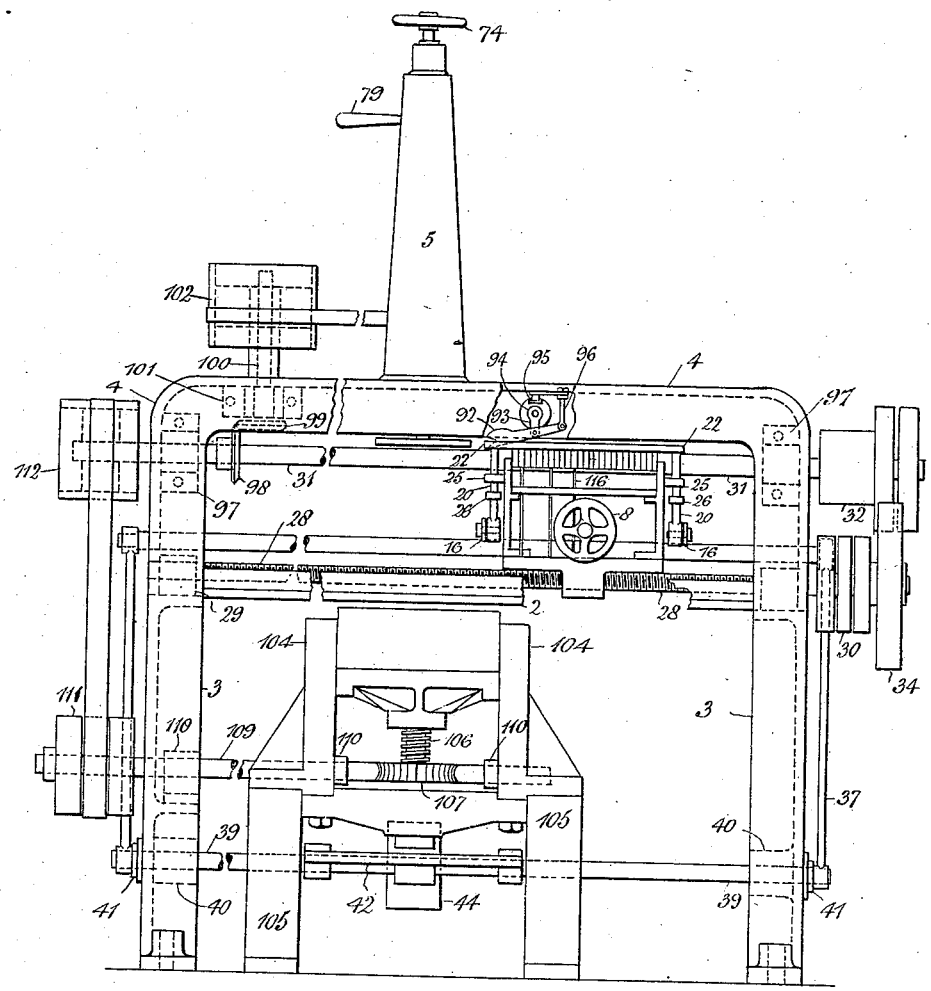

UNITED STATES PATENT OFFICE.

EDWARD FRANK SARGEANT, OF STROUD, ENGLAND.

MANUFACTURE OF LEATHER BELTING AND MACHINERY THEREFOR.

No. 884,528.　　　　Specification of Letters Patent.　　　Patented April 14, 1908.

Application filed August 3, 1906. Serial No. 329,131.

*To all whom it may concern:*

Be it known that I, EDWARD FRANK SARGEANT, A. M. I. C. E., M. I. M. E., a subject of the King of Great Britain, residing at Lower street, Stroud, in the county of Gloucester, England, have invented certain new and useful Improvements in the Manufacture of Leather Belting and in Machinery Therefor, of which the following is a specification.

According to this invention in order to effect the joining together of leather strips end to end the strips after being cut out of the hide to suitable width are at their ends placed on to a sliding table or bench moving on rails or guides at right angles to the length of the strip; this table has two clamps on it placed about ten inches apart, and so arranged that by moving suitable levers these two clamps grip the end of the strip firmly leaving a piece of belt about ten inches long exposed to the action of revolving knives which turn on a horizontal spindle running parallel to the length of the strip, these knives are shaped like the revolving cutters of a wood planing machine and act on the leather held between the clamps in the same way; the length of the knives is the same as that of the intended joint in the belting; the surface of the leather on which the knives are to act is not held parallel to the knives but inclined to them so that the end of the knives nearest the end of the strip cuts almost through the leather, while the other end of the knives just touches the upper surface of the leather, then by revolving the knives at a high speed about their horizontal axis and by moving the table along its rails or guides a sloping surface will be cut at the end of the strip, similar to the splice made by the scarfing machine at present used in the belting trade; this sloping surface or scarf does not continue right to the end of the strip, a short piece being left on beyond the scarf of full thickness of original leather; the object of this is to keep the strip firmly held in the sliding table during the cutting and subsequent operations. In order to prevent the leather being caught by the knives, it is advisable to form two or three notches about three sixteenths of an inch wide and half an inch deep in their cutting edges; these notches leave ridges across the scarf or joint of full thickness of the leather, and on these ridges flat springs are arranged to press, these springs being cleared by the notches cut in the knives. As the table travels forward in a direction at right angles to the length of the strip this sloping surface or scarf is cut right across the width of the strip and it may be from three inches to ten inches long according to the kind of belting being made; as the sliding table carries the leather strip clear of the revolving knives, it brings that part of the strip which has been cut, underneath a disk revolving about a vertical spindle and provided with pointed pins or knives projecting downwards to rough the surface of the leather and to remove the ridges.

After the table has carried the strip beyond this roughing apparatus, it carries the scarf under a glue brush which applies hot glue all over the newly cut surface and a cutter cuts off the strap-end which has been left on the splice at the outer end of the joint or scarf. The levers holding the clamps down are then released and the strip can be removed from the sliding table, and the freshly glued surface can be applied to the end of the belt being made. By doubling the strip transversely across its middle its two ends can be placed together in the clamps on the sliding table, side by side, and a scarf may be formed and glued at each end of the strip in one operation, thus effecting a great saving of time. As each strip is scarfed and glued at the ends as above described it is applied to the scarfed and glued end of the belt projecting from the belt press, the press is then raised and the newly made joint is drawn underneath and the press is then lowered, an operation which may be performed by a hand screw, by a belt driven screw, or by any other mechanical means; at the ingoing side of the press long steel guides are provided which can be adjusted to the width of the belt; these prevent the joint from being crookedly made; at the outgoing side of the press are short guides and adjustable knives and scrapers, to remove superfluous glue from the edges of the belt and to trim and pare the edges. It can then be taken away to the sewing machines, or to the hand sewers; when the joints are sewed the belt should be stretched, sized and polished on face and edges, measured and finally coiled up.

The drawings annexed show a machine constructed in the above manner.

Figure 2:
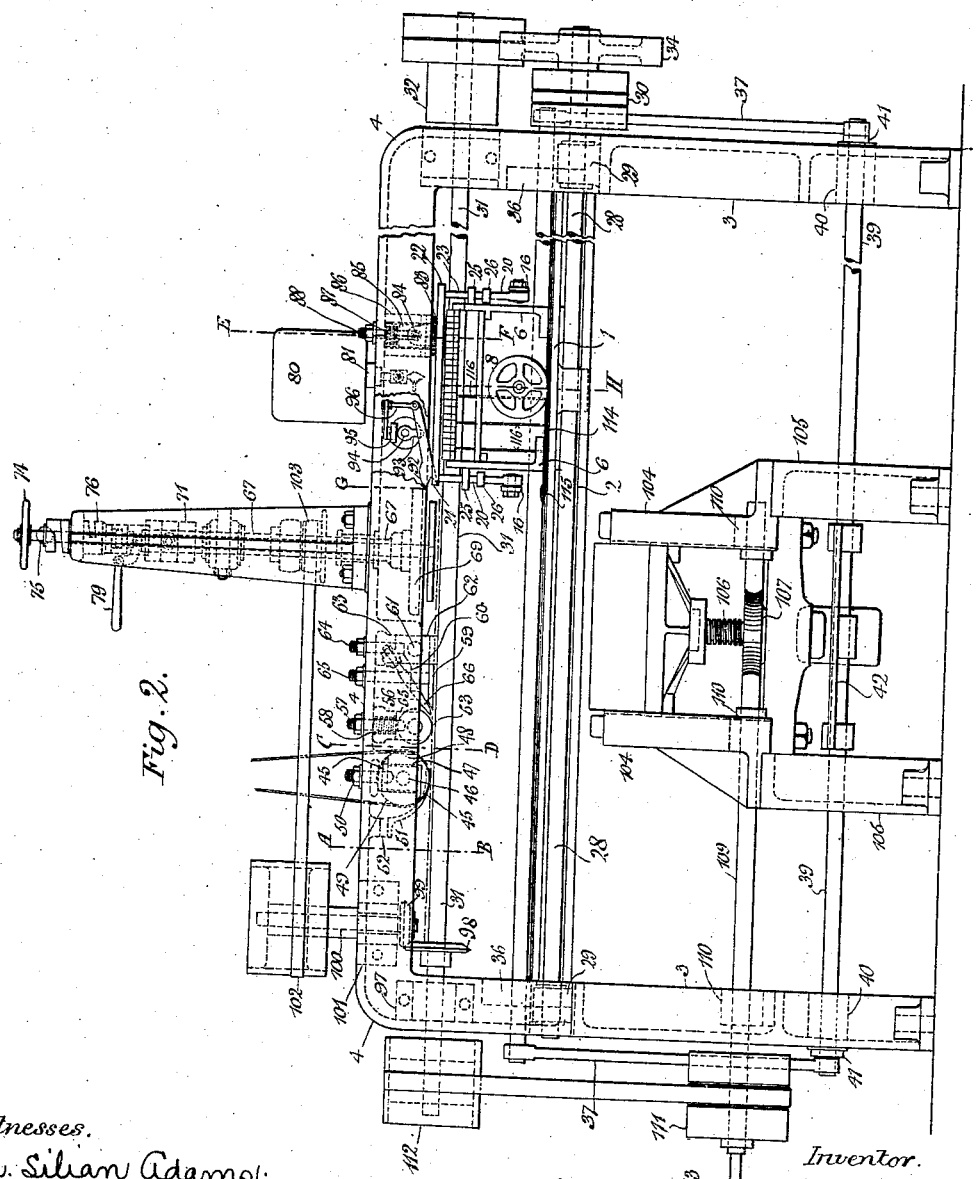
Figure 7:
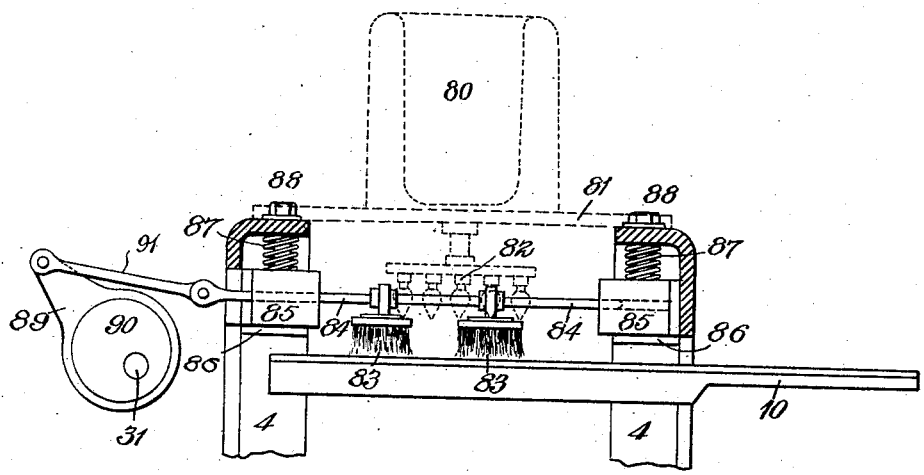

Figure 1 is an end elevation. Fig. 2 is a front elevation of the machine, and Fig. 3 is a plan view with some of the parts removed. Fig. 4 is a section on the line A B Fig. 2. Fig. 4× is a section on the line $a\ b$ Fig. 4. Fig. 5 a section on the line C D Fig. 2. Fig. 5× a section on the line $c\ d$ Fig. 5. Fig. 5a is a plan of one of the knives. Fig. 6 a section on the line G H Fig. 2. Fig. 6× is a similar section showing the carriage in elevation. Fig. 7 is a section on the line E F of Fig. 2. Figs. 8, 9, 10 and 11 show separate views of the cutter 70. Fig. 12 is a diagrammatic view illustrating the way in which the end portion of a strip of leather is beveled. Fig. 13 is an elevation partly in section showing the cutter 70 and the parts by which it is operated. Fig. 13× is a vertical section on the line $e$—$f$ of Fig. 13. Fig. 14 is an elevation partly in section of a modified construction of the machine in which the beveling off and roughening of the ends of the leather strips is effected solely by the cutter 70 and the mechanism for applying glue to the roughened surface is dispensed with.

1 is the sliding table moving on rails 2, which are supported by frames 3, the frames 3 are joined together by bridge pieces 4 from which are supported the various knives and cutters.

To the sliding table 1 are bolted the side frames 6 on which are cast guides, in which the horizontal table 7 may be moved in or out in a direction at right angles to the rails by means of the hand wheel and screw spindle 8 working in nut 9 which is cast to the sliding table 1. Supported from the horizontal table 7 at one end by means of eye bolts 19 and shaft 18 are a number of steel bars 10, which form the working table on which the strap or straps to be operated on are placed. This table is covered with leather. The other end of this table 10 can rise or fall and is supported by means of cross bar 11, on which is placed a rubber strip. The cross bar 11 is carried by the eye bolts 12 and levers 13, these levers are keyed to the shaft 14 on which is keyed levers 15 which bear on a pin at one end of levers 16. The levers 16 are carried from the clamp 21, by eye bolts 20, on which are placed collars 26 to prevent the clamp 21 being raised too high when the levers 16 are worked by the treadle motion which will be afterwards described. The weights 17 placed on the levers 16 keep the working table 10 up to the clamp 22. The eye bolts 20 are guided by passing through guides 25, which pass through slots in the side frames 6, and are secured to the horizontal table 7. The clamp 22 is carried by the bolts 23 fitted with nuts so that it may be secured in any position to projections 24 cast on the side frames 6.

The sliding table 1 is traversed along the rails 2 by means of a screw cut in the horizontal shaft 28 which is supported by bearings 29. Mounted on this shaft are one fast and two loose pulleys 30 the central fast pulley being driven either by an open or a crossed belt from a fast pulley 32 on the main shaft 31. On the horizontal shaft 28 is a fly wheel 34 which gives to the horizontal shaft sufficient momentum to actuate the reversing gear.

The levers 16 are raised by a horizontal bar 35 which is guided at each end by guides 36 cast on the bridge pieces 4. This horizontal bar is worked by a treadle 42 bolted to the levers 38, which are keyed on the shaft 39. This shaft 39 works in bearings 40 which are cast on the frames 3; keyed on the ends of this shaft are levers 41, which work the horizontal bar 35 by means of the connecting rods 37. On the shaft 39 is secured a lever 43 on which is placed the weight 44 to balance the weight of the treadle 42.

The sliding table 1 with the strap to be operated on passes under the revolving knives 45, see Fig. 2, which are mounted on a shaft 46, which works in the bearings 47, these bearings work in guides 48 cast on the bridge pieces 4, and can be adjusted by the studs and nuts 50, which are screwed into the bearings 47. On the end of the shaft 46 is keyed a fast pulley 49 for revolving same.

In order to prevent the strap being caught up by the revolving knives 45, springs 51 are placed to bear on the strap, these springs are secured to the bridge bar 52; it must be understood that the knives have notches $x$ cut out so as to clear these springs. The sliding table then passes under the roller 53, which is mounted on the shaft 54, which works in the bearings 55, these bearings work in guides 56, cast on the bridge pieces 4; bearing on the top of the shaft bearing 55 are spiral springs 58 which press the roller 53 down on the strap being operated on, the studs and nut 57 are for adjusting the height of the roller 53. The sliding table then passes under the fixed knife 59 which removes the projections left on the strap by the notches cut out of the revolving knives 45. The fixed knife 59 is secured to the casting 60 which is mounted on the shaft 61 which is held in the bearings 62, these bearings work in guides 63, cast on the bridge pieces 4, and can be adjusted by the studs and nuts 64 screwed into the bearings 62. The front or cutting edge of the fixed knife 59 is adjusted by the studs and nuts 65. At the sides of the fixed knives 59 are placed two knives 66, which can be adjusted by means of nuts so as to cut the strap to the required depth. The sliding table then passes under a revolving horizontal disk or face plate 69 carrying on its underside a knife 70, shown separately in Figs. 8, 9, 10 and 11, which removes any unevenness of surface which the previous knives may have left and also roughens up the fiber of the leather so as to take the glue and make a stronger joint. The disk or face plate 69 is keyed to a hollow vertical spindle 67, which revolves in the bearings 68, which are part of the bridge 5 which spans the bridge pieces 4 and ties them together.

The vertical hollow spindle 67 can be raised and lowered by means of the handle 75 (see Fig. 1) which works on a quick screw 76 and lifts and lowers a bridge 73 working in guides on the bridge piece 5, while the bridge 73 is connected to a loose collar 71 held between two fixed collars on the top of the vertical spindle 67, by means of the connecting links 72. The vertical spindle 67 can be adjusted by means of the screw (which passes down the center of the quick screw 76) and the hand wheel 74. Passing through the vertical spindle 67 is a small spindle 77, on which is mounted a circular plate 78 which may be pressed down on the leather being operated on by means of the handle 79, see Fig. 2. The sliding table then passes under a fixed knife 92 which cuts off the strap end to the required length or the cutting off of the end may be deferred until after the roughened surface has been glued. The fixed knife 92 is jointed to a nut 93 which may be moved along the shaft 94 by means of a screw and hand wheel, the nut is kept from turning by a projection from it entering a slot in cross bar 95, and to the top of this projection is fixed a plate carrying an eye bolt 96 to which the rear end of the knife is coupled and by which the knife can be adjusted. Passing through the sliding table 1 from the underside of the strap being operated on are steel pins 116 which extend down to a guide surface 114 fixed to the frames 4, on this surface is a convex piece 115, just in front of the fixed knife 92 so that when the steel pins pass over the convex piece they are raised and thus allow the fixed knife 92 to get on the underside of the strap. The sliding table then passes under a glue pot 80 which is supported by a cross bar 81, and is fitted with a pipe with cocks 82, which supply the glue to the strap; just at the back of these cocks are brushes 83 mounted on a horizontal spindle 84 and receiving a cross movement by means of the eccentric strap 89 and link 91. The eccentric 90 is keyed on the horizontal shaft 31. The horizontal spindle 84 is guided in bearings 85 which can move up and down guides 86 cast on the bridge pieces 4; bearing on the top of the horizontal spindle bearings 85 are spiral springs 87 which press the brushes down on the strap being operated on. The bearings 85 are adjustable by the studs and nuts 88 screwed into same.

The main shaft 31 passes through bearings 97 fixed on the bridge piece 4; keyed on the main shaft is a bevel wheel 98 working into a bevel wheel 99 fixed on a vertical spindle 100 which works in a bearing 101, fixed to the bridge piece 4. Keyed to this vertical spindle is a fast pulley 102, which drives a fast and loose pulley 103 on the vertical shaft 67 to which is fixed the revolving knives. Under the rails 2 of the above machine is placed the strap press 104 supported on frames 105; on the screw 106 for operating the press is the worm wheel nut 107, worked by a worm 108 keyed on the shaft 109, working in bearings 110; mounted on this shaft 109 are fast and loose pulleys 111, driven by a fast pulley 112 on the main shaft 31 by means of an open and a crossed belt. In a tapped hole at the end of shaft 109 works an eye bolt 113 by means of which the belts are moved from one pulley to the other and the motion of the press reversed.

The operation of the machine is as follows:—Assuming the sliding table 1 to be at the extreme left hand end of the rails 2 and that the joint connecting one end of a leather strip to the belt that is being formed is held in the belt press 104 and that the free end of this strip is bent up as shown in the end elevation and inserted side by side with the end of a second strip as afterwards described between clamps 21 and 22 and the hinged leather covered table 10, then by releasing the treadle 42, the weight 17, through the intervention of levers 16, 15 and 13 and rubber covered cross bar 11, causes the table 10 to rise by turning on spindle 18, and to grip the strip against the fixed adjustable clamp 22 at one end of the proposed joint, while the rising clamp 21 is pulled downwards by means of eye bolts 20 and firmly holds the leather down to the table 10 at the other end of the proposed joint.

It is preferable, in the construction of the machine, to place the center of spindle 18 exactly underneath the inner edge of clamp 21, and the eye bolts 19 must be so adjusted that the surface of table 10 underneath clamp 21 must be practically on the same level as the underside of clamp 22; when the leather strip is clamped to table 10 adjusted in this manner, it will be seen that its upper surface slopes downwards from clamp 21 to clamp 22, and that if a horizontal cut be taken through the leather on a level with the underside of clamp 22, it will form a sloping surface on the leather, thick at the end nearest clamp 22 and tapering down to almost nothing at clamp 21. The table 10 being as above described made of a number of flat leather covered bars, having their outer ends resting on a rubber cushion, each bar is pressed upwards independently by the rubber cushion, and it follows that the whole width of the leather strip is pressed evenly up against underside of clamp 22, and even if several strips of different thicknesses be held on table 10 at one and the same time their upper surfaces will all be held up against clamp 22. By raising clamp 22 slightly higher than surface of table 10 at clamp 21 it is plain that if the knives be made to cut almost down to the table at clamp 21 they will, since they act in a horizontal plane, cut rather below the surface at clamp 22 and a joint so produced will have the appearance shown diagrammatically in edge view in Fig. 12 so that one end of the joint will have a sinking at 118.

When the free end of the strip which is in the belt press 104 (see end elevation) is in position to be held by clamps 21 and 22 and table 10 adjusted as above described, a second strip is placed in position on the table beside it, the two strips being held firmly side by side on the table by the clamps; the table with the strips is then set in motion by the screw cut on shaft 28, while one end of one of the strips is firmly held in the belt press 104; as the table travels towards the right, the revolving knives 45 which make a horizontal cut come in contact with the leather, and form a cut in it from 117 to 118 as shown in Fig. 12, the leather being held down between points 117 and 118 by the springs 51 which pass into deep notches on the knives as above explained; these springs press on the upper surface of the leather, which is of course not cut away underneath the springs, owing to the notches on the knives. The table still traveling onwards brings the leather strip underneath the roller 53 held down by springs 58, the roller being placed a little in front of the cutting edge of a fixed horizontal knife 59. This knife removes the ridges left by the revolving knife 45.

The leather strip is next brought below the cutter 70, shown separately in Figs. 8, 9, 10 and 11, it has narrow horizontal cutting edges 119 which are carried round in a horizontal plane and pointed vertical cutting edges 120 which project slightly below the horizontal cutting edges and consequently make a series of circular cuts into the surface of the leather as it passes underneath them: this sufficiently roughs up the joint and enables it to hold the glue. Horizontal guard pieces 121 formed with the knives rest on the surface of the leather and hold it down as the cutting blades act upon it. The leather is also held down by the central circular plate 78. The spindle 67 carrying the cutters should be driven at a high speed say 1600 to 2000 revolutions a minute.

When the table has carried the strip beyond the cutters 70 it brings the edge of the strip into contact with a knife 92; this knife is placed close alongside of clamp 21, and slides in a slotted cross bar 95 being traversed along same by a screw 94; it can be raised or lowered vertically by a screw 96; in order to guide the thin end of splice into jaws of knife 92 holes are drilled through tables 10 and 7 and into these holes long pins 116 are dropped their upper ends (preferably covered with leather) being level with surface of table 10 while their lower ends rest on a bar 114; on this bar a convex piece 115 is riveted just in front of cutting edge of knife 92; as the pins 116 pass over convex piece 115 their upper ends are raised above table 10 and carry with them the leather strip on which the sloping joint has been cut, raising it into the jaws of the knife 92, which as the table travels onwards cut off the strap end from the joint. The strip end is lastly carried below the glue pot 80 which has a pipe leading from the bottom ending in a number of small nozzles 82 each provided with a separate stop cock worked by one common lever from a stop or projection fixed on the table 10; these pipes and cocks being water jacketed; as the strip on the table comes under these nozzles, the cocks are opened and fine streams of glue descend on the prepared joint; this glue is spread all over the joint by the brushes 83 carried by bar 24 worked by eccentric 90 on main shaft 31. The table 10 is now nearly at its extreme limit of travel and has pushed the belt which has been rotating screw shaft 28 on to the loose pulley by means of a stud on the strap striking gear; the small fly wheel 34 keeps shaft 48 rotating for a little longer, which consequently carries table 10 still farther to the right and thereby brings the crossed belt on to the fast pulley on shaft 28 which reverses this shaft and causes table 10 to traverse the other end of machine once more; before this happens the operator depresses treadle 42 thus releasing the two strips with their properly shaped and glued ends from underneath clamp 22; the two glued surfaces are then pressed together, taking care to keep the two strips in a straight line; the belt press is opened by means of a worm 108 acting on worm wheel nut 107 the worm being formed on a shaft 109 turned by pulleys 111 acted on by open and crossed belts from pulley 112 keyed on main shaft 31. The operator works the belts by means of an ordinary striking gear but when the press is opening or closing the belt is automatically thrown on to the loose pulley by means of an eye bolt 113 which passes up the center of the shaft 109; as this shaft revolves this eye bolt works in or out and acting on the belt striking gear through suitable links not shown in the drawing throws that belt which is turning the shaft 109 on to its loose pulley, and a small flywheel on shaft 109 has sufficient momentum to rotate the shaft and worm wheel nut 107 until the press is tightly closed or sufficiently open as the case may be. The cycle of operations is now complete for a fresh joint is in the press and the free end of this strip can be brought up to table 10 and cut and glued in the same way with a third strip.

It has been found that the revolving cutter 70 shown in Figs. 8, 9, 10 and 11 may be used alone without first acting on the leather by the revolving knife 45 and fixed knife 59 and that the joint may be properly cut and roughed up at one operation by such cutter. The machine when thus modified is shown in elevation in Fig. 14. As this arrangement saves the complication caused by knives 45 and 59 and roller 53 I prefer it for all general purposes; although for very hard leather or very long joints it may be found preferable to employ the three sets of knives or cutters as in these cases the knives 45 assist the cutter 70 by previously removing a considerable portion of the leather from the joint, the ridges being removed and the joint roughed up by the cutter 70 either with or without the intervention of horizontal knife 59.

In the arrangement which I prefer for all general purposes (namely in forming all ordinary joints from 4 to 6 or 7 inches long) I as above stated make use of cutter 70 alone. In order to prevent the horizontal guards 121 of these cutters from catching underneath the strip or table 10 it is preferable to employ the central circular plate 78 hereinbefore described. The use of the guard plate 78 enables the joints to be left with thinner points and in addition by pressing guard plate 78 down on the joint with sufficient pressure the strip may be held to table 10 without the use of clamp 21 and will not be carried round or caught up by revolving cutter 70.

What I claim is:—

1. The combination of a table for supporting a strip of leather while being scarfed, clamps carried by the table for holding the leather at opposite ends to the portion to be scarfed, a cutter operating between the clamps for forming a scarf or bevel in the leather and means for causing the cutter to operate upon the strip crosswise to form the scarf therein.

2. The combination of a table for supporting a strip of leather, a revolving cutter above it, means for traversing one past the other, two clamp bars above the table one on one side of the revolving cutter and the other on the opposite side and both bars parallel with the line of traverse and adapted to hold the strip of leather against the table so that the leather is held on both sides of the revolving cutter while it is being cut.

3. The combination of a table for supporting a strip of leather free to turn on a hinge at one end, a revolving cutter above the table, means for traversing one past the other, two horizontal clamp bars above the table, one lying across the table near to the hinge joint and drawn downwards, while the other bar is fixed and lies across the table at a distance from the hinge and means for pressing the free end of the table upwards whereby the upper surface of the portion of leather below the fixed bar is kept by this bar at one fixed level while the underside of the leather below the other bar is also held at one fixed level by being held down on to the table close to the hinge.

4. The combination of a table for supporting a strip of leather free to turn on a hinge at one end, a revolving cutter above the table, means for traversing one past the other, two horizontal clamp bars above the table, one lying across the table near to the hinge joint, while the other is fixed and lies across the table at a distance from the hinge, levers carried by the ends of the first clamp bar, means for drawing downwards one end of these levers, connections from the other ends of the levers to the free end of the table tending to lift this free end, a treadle and rods operated by it for lifting the ends of the levers which are drawn downwards whereby when the treadle is operated, the leather on the table is simultaneously freed from both clamp bars, the table dropping away from one clamp bar and the other clamp bar being lifted away from the table.

5. The combination of a table for supporting a strip of leather, a revolving vertical or approximately vertical shaft above it, means for traversing one past the other and two cutter blades carried by the vertical shaft, one at right angles to the shaft for cutting the upper surface of the leather to an incline or bevel and the other parallel with the axis and scoring or cutting shallow grooves in the bevel surface.

6. The combination of a table, horizontal guides along which it can be traversed to and fro, clamps by which the ends of strips of leather can be held down on to the table at right angles to the guides, cutters by which the ends of the strips clamped to the table are cut to a bevel as the table is traversed along the guide and gluing appliances past which the beveled portions of the strips are subsequently carried by the table and have glue applied to them.

7. The traversing table having its upper surface formed of numerous parallel bars hinged at one end and supported at the other by an elastic cushion.

8. The combination of a table for holding the end of a strip while being scarfed, clamps carried by the table for holding the strip at opposite edges, a revolving cutter above the table for forming a scarf in the strip, a fixed knife operating upon the scarfed portion of the strip, a revolving cutter for finishing the surface of the scarfed portion and for roughening the leather, means for moving the table past the cutters and gluing appliances past which the leather is moved by the table.

9. The combination of a cutter for forming a scarf at the end of a leather strip, a table arranged below the cutter, means for traversing the table back and forth relatively to the cutter, a work table adjustable transversely to the direction of travel of the table, clamping devices at opposite ends of the work table for holding the strip of leather at opposite ends of the portion to be scarfed and means for operating the clamping devices simultaneously.

10. In a leather trimming machine, a work table comprising a plurality of hinged bars, clamp bars at opposite ends of the working portions of the hinged bars, a yielding support for the hinged bars at one end and means for adjusting said support.

EDWARD FRANK SARGEANT.

Witnesses:
ARTHUR CARPINALL, Jun.,
JOHN HENDERSON WHITEHEAD.